United States Patent
Sivasubramaniam et al.

(10) Patent No.: US 9,975,194 B2
(45) Date of Patent: May 22, 2018

(54) METHOD FOR ULTRASONIC WELDING WITH PARTICLES TRAPPING

(71) Applicant: ABB Technology AG, Zurich (CH)

(72) Inventors: Venkatesh Sivasubramaniam, Aesch (CH); David Guillon, Vorderthal (CH); Dominik Trüssel, Bremgarten (CH); Markus Thut, Seon (CH); Samuel Hartman, Staufen (CH)

(73) Assignee: ABB Schweiz AG, Baden (CH)

( * ) Notice: Subject to any disclaimer, the term of this patent is extended or adjusted under 35 U.S.C. 154(b) by 0 days. days.

(21) Appl. No.: 15/067,779

(22) Filed: Mar. 11, 2016

(65) Prior Publication Data
US 2016/0193678 A1 Jul. 7, 2016

Related U.S. Application Data

(63) Continuation of application No. PCT/EP2014/058604, filed on Apr. 28, 2014.

(30) Foreign Application Priority Data

Sep. 17, 2013 (EP) ..................... 13184769

(51) Int. Cl.
*B23K 1/06* (2006.01)
*B23K 20/10* (2006.01)
(Continued)

(52) U.S. Cl.
CPC .............. *B23K 1/06* (2013.01); *B23K 20/10* (2013.01); *B23K 20/26* (2013.01); *B29C 35/0261* (2013.01)

(58) Field of Classification Search
CPC ......... B23K 1/06; B23K 20/10–20/106; B23K 20/26; B29C 35/0261
(Continued)

(56) References Cited

U.S. PATENT DOCUMENTS 3,393,102 A 7/1968 Carroll et al.
3,586,122 A 6/1971 Jacke
(Continued)

FOREIGN PATENT DOCUMENTS

JP 02105513 A * 4/1990
JP 2006186401 A * 7/2006
(Continued)

OTHER PUBLICATIONS

Machine translation of JP 2010-040615A (no date available).*
(Continued)

*Primary Examiner* — Kiley Stoner
(74) *Attorney, Agent, or Firm* — Taft Stettinius & Hollister LLP

(57) ABSTRACT

The present invention relates to a method of connecting two components by ultrasonic welding for producing a power semiconductor module, said method comprising the steps of: a) Aligning the components to be welded to form a welding interface; b) Aligning a welding tool to the aligned components; c) Removably arranging a trapping material at least partly encompassing the welding interface, whereby the trapping material is a foam; and d) Connecting the components by activating the welding tool. The method like described above provides an easy and cost-saving measure in order to prevent particle contamination when performing a welding process such as particularly an ultrasonic welding process sue to scattered particles.

20 Claims, 1 Drawing Sheet

(51) Int. Cl.
*B23K 20/26* (2006.01)
*B29C 35/02* (2006.01)

(58) Field of Classification Search
USPC .............. 228/110.1, 1.1; 156/73.1–73.6
See application file for complete search history.

(56) References Cited

U.S. PATENT DOCUMENTS

| | | | | |
|---|---|---|---|---|
| 4,157,932 A * | 6/1979 | Hirata | | C09J 5/06 156/310 |
| 4,770,730 A * | 9/1988 | Abe | | B29C 65/08 156/312 |
| 4,781,943 A * | 11/1988 | Toba | | H05K 3/0088 134/22.1 |
| 5,239,806 A * | 8/1993 | Maslakow | | H01L 21/50 257/E21.499 |
| 5,316,610 A * | 5/1994 | Tamaki | | H01L 21/67144 156/379.6 |
| 5,351,536 A * | 10/1994 | Uchiyama | | G01F 1/684 73/204.26 |
| 5,746,856 A * | 5/1998 | Hendershot | | B29C 66/5221 156/157 |
| 5,786,271 A * | 7/1998 | Ohida | | H01L 23/3121 257/778 |
| 5,811,351 A * | 9/1998 | Kawakita | | H01L 22/20 257/E21.525 |
| 5,866,950 A * | 2/1999 | Iwasaki | | H01L 21/563 257/780 |
| 5,969,461 A * | 10/1999 | Anderson | | H01L 24/32 174/260 |
| 5,987,992 A * | 11/1999 | Watanabe | | G01S 7/521 310/315 |
| 6,051,093 A * | 4/2000 | Tsukahara | | H01L 21/563 156/251 |
| 6,077,382 A * | 6/2000 | Watanabe | | H01L 24/29 156/299 |
| 6,100,597 A * | 8/2000 | Nakamura | | H01L 21/563 257/737 |
| 6,172,422 B1 * | 1/2001 | Chigawa | | H01L 21/563 257/673 |
| 6,193,136 B1 * | 2/2001 | Higashi | | B23K 20/10 156/73.1 |
| 6,269,999 B1 | 8/2001 | Okazaki et al. | | |
| 6,437,450 B1 * | 8/2002 | Baba | | H01L 21/563 257/778 |
| 6,475,667 B1 * | 11/2002 | Onishi | | H01M 2/266 29/623.4 |
| 6,761,993 B1 * | 7/2004 | Karasawa | | H01M 2/266 429/161 |
| 6,774,466 B1 * | 8/2004 | Kajiwara | | H01L 21/561 257/673 |
| 6,993,832 B2 * | 2/2006 | Yamauchi | | H01L 21/67132 257/E21.511 |
| 7,394,163 B2 * | 7/2008 | Baba | | H01L 21/563 228/1.1 |
| 2002/0149829 A1 * | 10/2002 | Mochizuka | | G02F 1/153 359/265 |
| 2003/0138692 A1 * | 7/2003 | Asahina | | H01M 2/24 429/158 |
| 2006/0091184 A1 * | 5/2006 | Bayot | | B23K 1/06 228/110.1 |
| 2008/0060741 A1 * | 3/2008 | Privitera | | B32B 27/00 156/73.1 |
| 2008/0296780 A1 * | 12/2008 | Yoo | | H01L 24/05 257/780 |
| 2009/0133803 A1 * | 5/2009 | Lehto | | A61F 13/15707 156/73.1 |
| 2010/0084748 A1 * | 4/2010 | Poddar | | H01L 21/4832 257/666 |
| 2011/0073598 A1 * | 3/2011 | Liscio | | B65F 1/10 220/211 |
| 2011/0155444 A1 * | 6/2011 | Stremsdoerfer | | C23C 18/1601 174/350 |
| 2011/0210483 A1 * | 9/2011 | Itoh | | C03C 27/08 266/44 |

FOREIGN PATENT DOCUMENTS

| | | | |
|---|---|---|---|
| JP | 2006186402 A | * | 7/2006 |
| JP | 201040615 A | | 2/2010 |
| WO | 2014000975 A1 | | 1/2014 |

OTHER PUBLICATIONS

European Search Report, EP13184769.1, dated Mar. 14, 2014, 5 pages.
International Search Report and Written Opinion, PCT/EP2014/058604, dated Nov. 19, 2014, 8 pages.

* cited by examiner

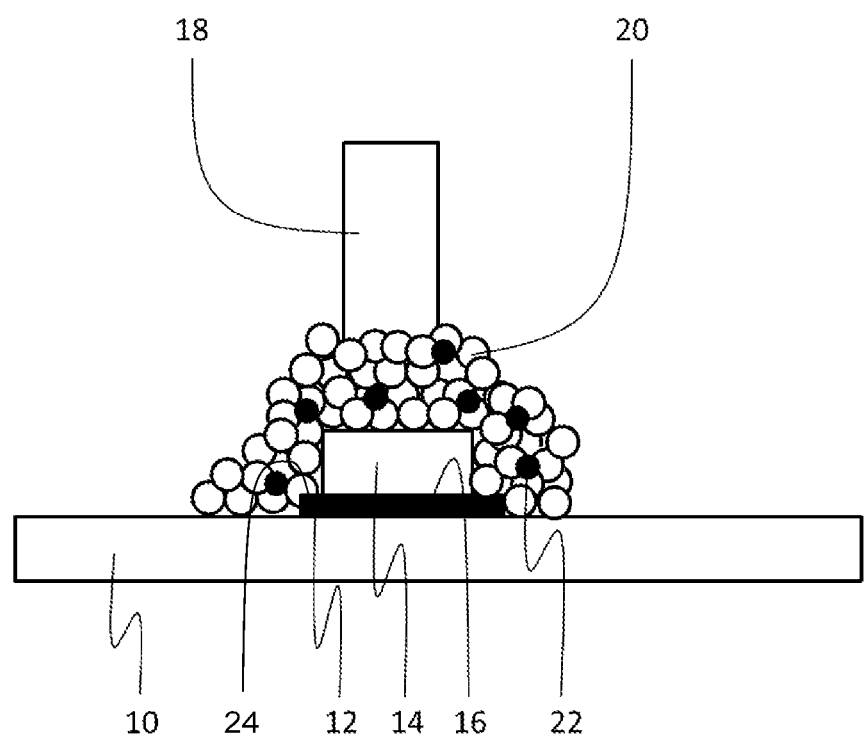

METHOD FOR ULTRASONIC WELDING WITH PARTICLES TRAPPING

TECHNICAL FIELD

The present invention relates to a method of connecting two components by welding, in particular by ultrasonic welding, in particular for producing a power semiconductor module. In particular, the method according to the invention provides a measure for reducing contamination due to metal particles produced at a welding step.

BACKGROUND ART

Power semiconductor modules are known in the art. Generally, power semiconductor modules comprise a baseplate, on which baseplate electrical conductors such as metallizations are provided which serve as a location for power semiconductor devices, or chips, respectively. Said chips are connected to terminals, such as control terminals. Further, additional circuit boards may be provided which are positioned in a distance from the power semiconductor devices and arranged above said power semiconductor devices. The above defined arrangement is generally located in a housing which is filled with an insulating gel, such as silicon gel.

Ultrasonic welding (US welding) is known in the power semiconductor industry for the welding of terminals to metalized ceramic substrate. The ultrasonic welding is advantageous in terms of reliability and production throughput when compared to traditional joining techniques such as soldering.

It is, however, known for such welding processes that small sized particles are ejected out from the joining partners by mechanical forces with high temperatures and velocity such, that they get embedded in or adhered on various building blocks used for the module packaging. Further particles are also scattered when the welding tool cleans itself using ultrasonic vibration. If the particle debris is not completely removed, they may trigger poor partial discharge properties and breakdown of electrical insulation especially at high voltages. Therefore, regarding ultrasonic welding, a primary challenge is to clean the metal particles generated during the welding process.

JP2010040615 A describes a semiconductor device which includes a wiring pattern formed on an insulating substrate, a semiconductor element mounted on the wiring pattern and a lead frame mounted on the wiring pattern by ultrasonic bonding. A resin is applied around the ultrasonic bonded lead frame. According to this document, scattering of scrap metal generated in connection of the substrate wiring with the external connection lead by ultrasonic bonding should be prevented.

However, an ultrasonic welding process still has potential for improvements in particular with regard to contamination due to scattered particles.

DISCLOSURE OF INVENTION

It is an object of the present invention to provide a method of connecting two components by welding, in particular by ultrasonic welding, which provides an improved contamination behavior with regard to scattered particles.

This object is achieved by a method according to independent claim 1. Advantageous embodiments are given in the dependent claims.

In particular, the present invention provides a method of connecting two components by welding, in particular by ultrasonic welding, in particular for producing a power semiconductor module, said method comprising the steps of:
a) Aligning the components to be welded to form a welding interface;
b) Aligning a welding tool to the aligned components;
c) Removably arranging a trapping material at least partly encompassing the welding interface, whereby the trapping material is a foam; and
d) Connecting the components by activating the welding tool.

Such a method of connecting two components by welding provides an improved confinement behavior with regard to scattered particles and is further especially cost-saving to perform.

Like it will be apparent down below it has to be noted that the steps a) to d) like defined above and like defined in claim 1 may generally be performed not strictly in the order as chronologically mentioned, but these steps may be performed in any order which is appropriate. Advantages of respectively exemplary deviating orders are described in detail down below.

The method according to the present invention is thereby generally applicable for welding processes. However, the use of a trapping material like described above may particularly be advantageous for ultrasonic welding due to the fact that in most cases it may not be completely avoided that particles of the components to be connected, or joined, respectively, are scattered and thus spread to the vicinity of the welding region.

Further, the components to be connected by welding are generally not restricted. The welding method according to the invention may thus be applicable for connecting metallic components, such as copper components, non-metallic components or metallic components to non-metallic components. Non-limiting examples of non-metallic compounds comprise inter alia polymers such as electrically conducting polymers. As an example, the present invention is well suitable for plastic to metal, such as copper, welding as this may allow a welding process in which components may be welded which may not be welded in an advantageous manner according to the methods of the prior art. The latter essentially becomes possible due to the confinement effect of the present invention.

Especially, the method according to the present invention may be suitable in the field of power semiconductor modules. Especially when producing power semiconductor modules, metallic components have to be connected to each other or to plastic materials. Ultrasonic welding may thereby be used for connecting a terminal to a metallization located on a baseplate, for example. Especially when thinking about high voltages which may occur when using such power semiconductor modules, a negative influence of scattered particles may have a significant influence, which is avoided according to the present invention like will be described in detail down below.

The method according to the invention comprises step a) according to which the components to be welded are aligned to form a welding interface. According to this step, the two components to be connected, or joined, respectively, by welding are aligned such, that they are in close vicinity to each other and preferably are touching each other at the position at which they should be welded together. The touching position thereby forms an interface at which the welding procedure should take place and thus a welding interface. With regard to the non-limiting example of performing the method within a method of producing a power semiconductor module, for example, a terminal may be transported to its position on a metallization, which position may be located on a substrate. The terminal may thus contact the metallization and may thus form a welding interface at the touching position.

The components to be welded may thereby be pressed together via an application of pressure in order to achieve a superb welded connection.

According to further step b), the method comprises the step of aligning a welding tool to the aligned components. According to this step, the tool which is used for performing the welding step is aligned such, that a welding process may start. In case an ultrasonic welding is performed, the welding tool may thus be a sonotrode which may be generally known in the art. The sonotrode may create ultrasonic vibrations and may in turn apply this vibrational energy to the components to be connected, or welded, respectively. The welding tool such as the sonotrode may thus contact one of the components to be connected and my thus apply the energy to the components and thus to the welding interface.

In order to position the components to be connected under pressure with regard to each other, the components to be connected may be aligned between an anvil and the welding tool, such as the sonotrode, for example.

According to further step c), the method comprises the step of removably arranging a trapping material at least partly encompassing the welding interface.

The method is thus based on providing a particle confinement using a trapping material, or trapping compound, respectively, around the welding zone in which all or at least a major plurality of ejected particles are trapped. The trapping compound may be be applied after the alignment of the components according to step a), for example, such as a terminal block on substrate baseplate assembly, and especially before the welding process starts. The usage of a trapping material thereby has significant advantages with regard to cleaning the vicinity of the welding interface in order to remove the scattered particles like will be described down below.

In fact, the method according to the invention is superior compared to cleaning processes such as air suction methods or blow methods and thus non-contact cleaning methods due to the fact that it is very difficult and complex to ensure that all scattered particles are removed either by pre- or post- or in-situ cleaning processes. This may be due to the fact that hot particles with high velocity may scatter in a non-defined region and embed themselves into organic materials such as polyimide. In addition, small particles adhere readily to surfaces due to strong electrostatic forces. Therefore non-contact methods such as using air suction or air blow do not completely ensure particle free modules. Further increasing the air flow can also alter the operational frequency range of the sonotrode.

The method like described above, however, may further be superior with regard to physico-chemical cleaning methods and such over contact cleaning methods. Chemical cleaning methods typically involve high costs to replenish the cleaning solvents. Additionally chemistries have to be carefully chosen to avoid no effects to i.e. a coating such as a polyimide coating. Furthermore, these cleaning methods may have a negative effect regarding the environmental point of view.

According to the above, a particle confinement strategy has many advantages over the cleaning methods known from prior art.

The trapping material is thereby arranged such that it at least partly encompasses the welding interface. Accordingly, it may be assured that all particles may securely be trapped in the trapping material so that a contamination of respective surfaces with the scattered particles is not to be expected. In contrast thereto, at least partially, preferably completely, encompassing the welding interface leads to preferably no contact of the scattered particles to the respective surfaces. A trapping material at least partly encompassing the welding interface thereby shall particularly mean that the trapping material surrounds the compounds to be welded or advantageously is positioned in direct contact to the welding interface, or its edge, respectively, and may potentially completely surround the welding interface, or its borders being formed from the components to be joined, respectively.

The fact according to which a trapping material is removably arranged further allows the advantage that even though an effective trapping procedure of scattered particles may be achieved like stated above, the material does not deteriorate the working conditions of the generated module such as the generated power semiconductor module. In contrast thereto, after the welding process is finished, the trapping material together with the trapped particles may not remain in the generated structure but in contrast thereto it may be subjected to an appropriate and easy cleaning procedure in order to optionally remove the trapping material after the welding process and thus to leave a well-defined surface.

Therefore, an optional post cleaning procedure may, if at all, focus on removing the trapping material which is much less demanding compared to post-cleaning procedure referring to removing particles sticking to surfaces of the generated structure.

According to further step d), the method comprises the step of connecting the components by activating the welding tool. Like stated above, the welding tool, such as the sonotrode, may thereby guide ultrasonic vibrations into one component and thereby further to the welding interface leading to the welding interface, or the respective regions of the components, to diffuse and thus to form a stable connection afterwards.

The frequency which is used for ultrasonic welding may thereby be chosen in dependence of the components to be welded. Generally but non-limiting, however, ultrasonic welding uses frequencies in the range of 16 kHz to 1 MHz, for example.

The method like described above may provide an effective and economical particle confinement method allowing preventing a particle contamination which provides diverse advantages.

In fact, by using a method as described above an improved performance of the generated device may be achieved. When thinking about using a power semiconductor device, for example, during operation, when voltage is applied, a metal particle in an unfavorable position could lead to an electrical short or an insulation breakdown, or unsatisfactory partial discharge (PD) behavior may occur. This may be disadvantages, for example, when thinking about particle-sensitive products where a high voltage is applied under operation, such as power electronic modules such IGBT modules with a blocking voltage up to 6.5 kV.

However, next to avoiding a negative influence regarding electronic properties due to scattered particles, such as metallic particles, a mechanic influence is also avoided. In detail, if metallic or non-metallic particles are deposited on or close to mechanically moving parts or bearings, the undesired particles could influence these moving parts. This in turn could lead to damage and may further lead to an early wear-out. Therefore, the devices a generated by a method according to the invention leads to the devices to be produced in a much more stable arrangement.

Apart from that, depending on the compounds to be connected, scattered particles obtained by ultrasonic welding may as well lead to a negative health impact to persons which are present in the circumference of a welding tool, such as operating personnel, so that by using the present invention, a health risk for operating personal, for example, may significantly be improved.

According to another aspect, it is often desired to work in a clean room environment, even in case different components are connected by ultrasonic welding. With this regard, due to the method according to the invention, scattered particles may securely be trapped in the trapping material so that a negative influence to a potentially desired clean room environment may securely be avoided.

Thus, generally by using the method according to the present invention, negative effects of scattered particles on the reliability of power electronic devices may be avoided and thus, in turn, the reliability of such devices may significantly be improved.

To summarize, the method like described above provides an easy and cost-saving measure in order to prevent particle contamination when performing a welding process such as particularly an ultrasonic welding process sue to scattered particles.

According to an embodiment, the trapping material is a foam, such as a fluid based foam or a solid foam, but could also be a gel or a textile. Especially the above-named trapping materials are in an advantageous manner suitable for securely and effectively trapping scattered materials based from an ultrasonic welding process, for example.

With regard to the foam, the latter may particularly be a fluid-based foam or a solid foam. A foam according to the present invention may particularly be a substance that is formed by pockets of a volume, for example filled by a gas, or a liquid, which pockets may be defined and thus encompassed by liquid or solid material. The fluid-based foam may thus be a foam which pockets are defined by a liquid, whereas a solid foam may be a foam which pockets are defined by a solid.

The fluid-based foam may for example be formed by a liquid, such as water or an alcohol which liquid may comprise a foam forming material, such as a detergent and/or a surfactant. The one or more detergents may generally comprise any detergent known in the art, such as an anionic, cationic, non-ionic, zwitterionic, amphoteric, alkaline, and/or caustic detergent. Additionally or alternatively, the foam may comprise one or more surfactants, such as with or without polymers and/or with or without acids. This could include detergent/soap based foams encountered in daily life such as shaving foam or industrial cleaning foams. Non-limiting examples of fluid based foams comprise anionic detergents such as sodium dodecyl sulphate (SDS), sodium lauryl sulphate (SLS) whereas examples of cationic detergents comprise dodecyl trimethyl ammonium chloride (DTAC).

Further, foams may be solid foams which may be formed, for example, from polyurethane materials. Further, they may be produced according to a preform, which may be formed by casting, moulding or spinning or any other process route. For example, the solid foam may be arranged sponge-like. They may be high or low temperature foams. High temperature foams normally may comprise materials like polyimide or silicon rubber. Low temperature foams are typically polyurethane based foams used in building industry for having noise, temperature and fire isolation. The pockets of the foam may be filled with suitable liquid or gas or solid in order to increase the stability of the trapping material that results in efficient particle entrapment during or after welding process. Examples for such materials comprise deionized water, for example, which at temperatures above 50° C. may result in better foam quality and stability than hard water which consists of salts and other mineral traces.

Next to foams, the trapping material may be formed from a textile. A textile suitable to be used as a trapping material may be any particularly flexible woven material comprising a network of natural or artificial fibres often referred to as thread or yarn. The textile, or particularly pores being formed by the textile may be filled with suitable liquid or solid or gas to increase the surface energy of the trapping material that results in efficient particle entrapment during or after welding process, such as with a surfactant like described above. Examples for textiles comprise cotton fiber pads or glass based wool or sponge used for packaging or in daily life furniture.

Further, the trapping material may have the form of a gel, wherein any kind of gel may be appropriate. Non-limiting examples of gels comprise silicon gels as they are known as a filling for power semiconductor modules.

The above named trapping materials have very effective trapping properties and are further very easy to be removed after the welding process. In fact, due to the nature of the trapping materials, they may be removed with easy methods and may further be removed without any residues, thus leaving a defined structure. In order to decrease oxidation reactions of the material coming into contact with the trapping material, especially the pockets of the foam or the pores of the textile may be filled with an inert gas which may act as a kind of shield for preventing oxidation reactions.

According to a further embodiment, step c) is performed before step b). According to this embodiment, the trapping material may be easily arranged thereby fully encompassing the welding interface. Additionally, due to the fact that according to this embodiment the trapping material may be arranged between the welding tool and the components to be connected, the welding tool may as well very effectively be secured from being contaminated due to the fact that the trapping material may trap essentially all particles which are scattered. This embodiment may particularly be suitable in case the trapping material is a gel or a liquid-based foam. It may thereby be noted that lots of used trapping materials are capable of effectively transferring ultrasonic energy to the welding partners because of which the welding force may under circumstances be not significantly lowered.

According to a further embodiment, step c) is performed after step b). According to this embodiment, the welding tool may effect a well-defined influence on the components to be welded and may thus exert a well-defined welding force. Apart from that, this embodiment may be particularly suitable in case a very high quality welding has to be achieved for example in case an electrical power supply line which may formed by the welding partners may have an especially low electrical resistance due to the fact that step c) is as well performed after step a). This embodiment may particularly be suitable in case the trapping material is a textile or a solid foam.

According to a further embodiment the method comprises the further step e) of performing a cleaning procedure after the welding step. According to this embodiment, the trapping material may be removed after the welding procedure, for example, and may thus ensure that no trapping material is left in the generated structure. Thereby, even though depending on the used trapping material, it may be appropriate to leave the trapping material in place under circumstances, according to this embodiment the danger of a deteriorating effect on the working performance of the generated device, such as on a power semiconductor device, may completely be avoided. The cleaning performance may thereby be focused on removing the trapping material along with particles trapped or stuck in the trapping material, allowing a less demanding, cost-saving, gentle as well as effective cleaning performance to allow a well-defined and clean device to be produced.

The cleaning procedure may thereby comprise application of a solvent, application of defoaming agents, wet cleaning, air sucking, air blowing, evaporating and/or burning, particularly in order to remove the trapping material and the trapped particles. Such cleaning procedures may be especially effective and further gentle with regard to the components coming in contact with these cleaning methods. Solvents may thereby particularly be organic or anorganic solvents which may dissolve the respective trapping material and may thus be chosen in dependence of the used trapping material. Wet cleaning shall mean cleaning with usage of water, defoaming agents may thereby be components which may decompose a foam and may be alcohols, for example. Air sucking and air blowing may thereby remove the trapping material such as the foam mechanically, evaporating may remove the trapping material such as the foam by means of an underpressure and burning may decompose and remove the trapping material such as the foam by means of temperature influence.

The cleaning methods according to this embodiment especially regarding removing the trapping material may thus be realized by, for example, by air suction or/and any organic solvent and/or by usage of a blast of air and/or water such as tap water or deionized water, depending on the used trapping material. Additionally or alternatively, the cleaning process could be enabled through spray or as a dip bath process with or without ultrasonic energy or any other kind of solvent agitation method.

Additionally or alternatively, the cleaning process could be enabled through a baking process, or burning process, respectively, and thus at elevated temperatures in order to evaporate solvent and/or water residues. The baking process, which shall mean a treatment of the trapping material under temperatures being elevated with regard to room temperature (22° C.) may be performed, for example, for times greater than 1 min and/or at temperatures greater than 25° C., wherein the baking process may be performed or not under reduced pressure and/or under an inert atmosphere.

Further conventional cleaning processes for cleaning the surfaces are not required but may as well be performed according to the prior art.

According to a further embodiment, the method comprises the further step f) pretreating at least one surface by a surface tension lowering material. According to this embodiment, the further advantage may be achieved according to which the respective surface is adapted such that scattered particles which in spite of the trapping material potentially reach that surface may not stick tightly to the respective surface but may be removed by a cleaning process easily. This allows decreasing the cleaning requirements and thus making the cleaning procedure more gentle. A surface tension lowering material could also help preventing oxidation of the weldable surface as well as, when applied to whole device, could serve as a humidity barrier. A surface tension lowering material may thereby in a non-limiting manner comprise fluoropolymers, polyvinylpyrrolidone (PVP) other organic capping agents used for nanoparticles which may for example be coated onto the respective surface.

Further, the surface tension may be lowered in a region of at least 0.1 mN/m with respect to the unprepared state. Thereby, afore-mentioned surface preparation may be performed only prior to application of the trapping material due to the fact that the so-prepared surface may as well improve the removability of the trapping material as such.

According to a further embodiment, step d) is performed at a temperature lying in the range of ≥10° C. to ≤80° C. According to this embodiment, the velocity of the scattered particles may be significantly reduced. According to this, it may be achieved that the scattered particles are not distributed over a huge region but the distribution may be strictly limited. This may reduce the trapping material required and may thus decrease the requirements with regard to a potential post-cleaning process.

According to a further embodiment, step d) is performed at a pressure lying in the range of ≤1 bar, in particular in the range of ≥1 mbar to ≤1 bar, or it may lie in the range of ≥1 bar, particularly to ≤6 bar. According to this embodiment, the welding process may be performed with a reduced pressure. This embodiment allows providing a very gentle welding process due to the fact that oxidation reactions of components being in vicinity to the welding interface, for example due to the presence of the trapping material, such as liquid based foam, such as water based foam, may significantly be reduced or totally avoided. This embodiment thus allows using the method according to the invention as well for connecting compounds which comprise materials, such as in the form of electrically conductive structures, which may be oxidized when using an atmospheric pressure, or atmospheric conditions, respectively. However, even overpressures may be appropriate for achieving an appropriate trapping effect in combination with a good welding result.

According to a further embodiment, step d) is performed under an atmosphere comprising an inert gas, such as for example nitrogen or argon. In particular, the respective atmosphere may comprise an inert gas in an amount of more than 90 vol.-%, or it may consist of an inert gas. This embodiment again allows providing a very gentle welding process due to the fact that oxidation reactions of components being in vicinity to the welding interface, for example due to the presence of the trapping material, such as liquid based foam, such as water based foam, may significantly be reduced or totally avoided. This embodiment thus allows using the method according to the invention as well for connecting compounds which comprise materials, such as in the form of electrically conductive structures, which may be oxidized when using an atmospheric pressure, or atmospheric conditions, respectively.

BRIEF DESCRIPTION OF DRAWING

These and other aspects of the invention will be apparent from and elucidated with reference to the embodiments described hereinafter.

In the drawing:

FIG. 1 shows a schematic view illustrating the method according to the invention.

DETAILED DESCRIPTION OF THE INVENTION

FIG. 1 shows a schematic view illustrating the method according to the invention. In detail, FIG. 1 illustrates a method of connecting two components by ultrasonic welding in the field of power semiconductor module production. In particular, a substrate 10 is shown on which substrate 10 a metallization 12 is provided. Further, a terminal 14 is shown which shall be welded to the metallization 12. The terminal 14 and the substrate 12 comprising the metallization 14 are aligned to form a welding interface 16. Further, a welding tool 18, such as a sonotrode, is aligned and may come in contact to the terminal 14. In order to perform the welding process, the sonotrode may be activated.

Further, a trapping material 20 is shown, which is removably arranged such, that it at least partly encompasses the welding interface 16. The trapping material 20 may thereby be arranged before or after aligning the terminal 14 and the substrate 10 with the metallization 12. The trapping material 20 is a foam, such as a fluid based foam or a solid foam, but could also be a gel or a textile. In case the trapping material 20 is a foam or a textile the pockets of the foam or pores of the textile may be filled with an inert gas or with a surfactant chemistries. Further, the density and/or viscosity of the foam may easily be adjusted by altering the quantity and material with all or one or two major constituents, e.g a solid and/or liquid and/or gas forming the foam. The foam may further be a single foam unit or multiple linked cell units. A single foam unit shall thereby mean for example one big bubble, whereas multiple linked cells shall mean lots of smaller bubbles that forms a denser foam material like in a shaving foam.

Application of the trapping material 20 could be locally around the welding region or all over the substrate baseplate assembly or introduced as a chamber filled with trapping material 20. The free area for the application of the trapping material 20 may thus be all or partly around the joining partners.

By trapping the scattered particles 22, the trapping material 20 may prevent particles 22 which are ejected out of the welding region due to welding forces to contaminate the surrounding of the components to be welded. In order to decrease particle ejection, the welding process may be performed at a temperature lying in the range of ≥10° C. to ≤80° C. The critical hot and fast particles 20 of sizes from typically nano to micrometer ranges can be easily trapped by the trapping material 20 due to its cooling capability and suitable surface tension to entrap particles 20 from all possible directions.

Especially in order to remove the trapping material 20 together with the trapped particles after the welding process but as well for removing particles 22 which potentially reached a surface, a cleaning procedure may be performed after the welding step. For example, an easy or reasonable post cleaning or/and post suction process may be performed and potentially followed by post baking. Post cleaning chemistry could involve defoaming chemistries for efficient cleaning and regeneration of cleaning chemistries.

In order to improve said cleaning step and/or in order to achieve a humidity barrier and/or in order to prevent oxidation, it may be provided that at least one surface, for example a plurality of surfaces or the whole of the surfaces, such as the whole of the power semiconductor device is pretreated by a surface tension lowering material 24. For example, the respective surface may be coated with the respective material 24. Material 24 may be, for example, polymeric. Non-limiting examples of suitable materials 24 may include fluoropolymers, polyvinylpyrrolidone (PVP) other organic capping agents used for nanoparticles. The particles 20 on the welding tool 18 may or may not be cleaned depending on the choice of particle trapping material 20.

Further, in order to prevent oxidation of materials coming in contact to the trapping material, the method may be performed at a pressure lying in the range of ≥1 mbar to ≤6 bar. Additionally or alternatively, the method may be performed under an atmosphere comprising an inert gas.

The components to be welded, i.e. the terminal 14 and the substrate 10, or its metallization 12, respectively, can further be designed in such a way that particles deposited in the trapping material 20 do not affect the operational properties of the product. In the case of metal particles 20 affecting the insulation properties, this could e.g. be achieved by metal surfaces of the components region covered by the trapping material 20

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 10 substrate
12 metallization
14 terminal
16 welding interface
18 welding tool
20 trapping material
22 particles

The invention claimed is:

1. A method of connecting two components by ultrasonic welding for producing a power semiconductor module, said method comprising the steps of:
    a) aligning the components to be welded to form a welding interface;
    b) aligning a welding tool to the aligned components;
    c) removably arranging a trapping material at least partly encompassing the welding interface, whereby the trapping material is a foam; and
    d) connecting the components by activating the welding tool,
    wherein pockets of the foam are filled with an inert gas or with a surfactant.

2. The method according to claim 1,
    wherein step c) further comprises removably arranging the trapping material at least partly encompassing the welding interface and in contact with the welding interface; and
    wherein step d) further comprises connecting the components by activating the welding tool after removably arranging the foam trapping material.

3. The method according to claim 1,
    wherein step c) further comprises removably arranging the trapping material at least partly encompassing the welding interface and in contact with at least one of the components,
    wherein step c) is performed before step b).

4. The method according to claim 2, wherein step c) is performed after step b).

5. The method according to claim 2, wherein said method comprises the further step:
   e) performing a cleaning procedure after the welding step.

6. The method according to claim 1, wherein said method comprises the further step e) performing a cleaning procedure after the welding step.

7. The method according to claim 6, wherein the performing a cleaning procedure comprises application of a solvent, application of a defoaming agent, wet cleaning, air sucking, air blowing, evaporating and/or burning.

8. The method according to claim 2, wherein the method comprises the further step:
   f) pretreating at least one surface of at least one of the components with a surface tension lowering material.

9. The method according to claim 2, wherein step d) is performed at a temperature lying in the range of ≥10° C. to ≤80° C.

10. The method according to claim 1, wherein step d) is performed at a pressure lying in the range of ≥1 mbar to ≤6 bar.

11. The method according to claim 1, wherein step d) is performed under an atmosphere comprising an inert gas.

12. The method according to claim 1, wherein the components to be welded are formed from a metal or a polymer.

13. The method of claim 1, wherein step c) is performed before step b).

14. The method according to claim 1, wherein step c) is performed after step b).

15. The method according to claim 3, wherein said method comprises the further step e) performing a cleaning procedure after the welding step.

16. The method according to claim 1, wherein the method comprises the further step f) pretreating at least one surface of at least one of the components with a surface tension lowering material.

17. The method according to claim 16, wherein the at least one surface is coated with a polymeric material.

18. The method according to claim 3, wherein the method comprises the further step f) pretreating at least one surface of at least one of the components with a surface tension lowering material.

19. The method according to claim 1, wherein step d) is performed at a temperature lying in the range of ≥10° C. to ≤80° C.

20. The method according to claim 3, wherein step d) is performed at a temperature lying in the range of ≥10° C. to ≤80° C.

* * * * *